United States Patent
Liang et al.

(10) Patent No.: US 12,438,141 B2
(45) Date of Patent: Oct. 7, 2025

(54) LAYERED-OXIDE POSITIVE ELECTRODE ACTIVE MATERIAL AND POSITIVE ELECTRODE PLATE, SODIUM-ION BATTERY, AND ELECTRIC APPARATUS CONTAINING SAME

(71) Applicant: CONTEMPORARY AMPEREX TECHNOLOGY (HONG KONG) LIMITED, Hong Kong (CN)

(72) Inventors: Zibin Liang, Fujian (CN); Qiang Li, Fujian (CN); Yuhao Wang, Fujian (CN); Xinxin Zhang, Fujian (CN); Jinhua He, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/128,296

(22) Filed: Mar. 30, 2023

(65) Prior Publication Data
US 2023/0238518 A1    Jul. 27, 2023

Related U.S. Application Data

(63) Continuation of application No. PCT/CN2021/142472, filed on Dec. 29, 2021.

(51) Int. Cl.
*H01M 4/1315* (2010.01)
*C01B 33/32* (2006.01)
*C01B 35/04* (2006.01)
*C01G 53/44* (2025.01)
*C01G 53/66* (2025.01)
*H01M 4/131* (2010.01)
*H01M 4/505* (2010.01)
*H01M 4/525* (2010.01)
*H01M 10/054* (2010.01)
*H01M 4/02* (2006.01)

(52) U.S. Cl.
CPC ........... *H01M 4/1315* (2013.01); *C01B 33/32* (2013.01); *C01B 35/04* (2013.01); *C01G 53/44* (2013.01); *C01G 53/66* (2013.01); *H01M 4/131* (2013.01); *H01M 4/505* (2013.01); *H01M 4/525* (2013.01); *H01M 10/054* (2013.01); *C01P 2002/72* (2013.01); *H01M 2004/021* (2013.01); *H01M 2004/028* (2013.01)

(58) Field of Classification Search
CPC .... H01M 4/1315; H01M 4/131; H01M 4/505; H01M 4/525; H01M 2004/028; H01M 10/054; C01G 53/66; C01G 53/44; C01B 35/04; C01B 33/32
See application file for complete search history.

(56) References Cited

U.S. PATENT DOCUMENTS

| | | | |
|---|---|---|---|
| 9,728,780 B2 | 8/2017 | Hu et al. | |
| 2020/0119347 A1* | 4/2020 | Tonosaki | H01M 4/485 |
| 2022/0037660 A1* | 2/2022 | Zhu | H01M 4/525 |
| 2022/0123299 A1* | 4/2022 | Huang | H01M 4/525 |

FOREIGN PATENT DOCUMENTS

| | | | |
|---|---|---|---|
| CN | 105576229 A | | 5/2016 |
| CN | 107093713 | * | 8/2017 |
| CN | 109585795 A | | 4/2019 |
| CN | 110461769 A | | 11/2019 |
| CN | 111129483 A | | 5/2020 |
| CN | 111244415 A | | 6/2020 |
| CN | 111554919 A | | 8/2020 |
| CN | 112670497 A | | 4/2021 |
| CN | 113258060 A | | 8/2021 |
| WO | 2016/147853 A1 | | 9/2016 |
| WO | WO 2018/181461 | * | 4/2018 |

OTHER PUBLICATIONS

International Search Report and Written Opinion mailed on Aug. 29, 2022, received for PCT Application PCT/CN2021/142472, filed on Dec. 29, 2021, 15 pages including English Translation.

European Search Report issued Aug. 30, 2024 in European Patent Application No. 21956968.8.

Guo, Yu-Jie et al., "Boron-doped sodium layered oxide for reversible oxygen redox reaction in Na-ion battery cathodes", Nature Communications, vol. 12, Article No. 5267, Sep. 6, 2021, XP093197068, DOI: 10.1038/s41467-021-25610-7.

Wang, Yong et al., "Influence of Li substitution on the structure and electrochemical performance of P2-type Na0.67Ni0.2Fe0.15Mn0.65O2 cathode materials for sodium ion batteries", Journal of Power Sources, vol. 396, Aug. 1, 2018, pp. 639-647, XP055962962, Amsterdam, NL ISSN: 0378-7753, DOI: 10.1016/j.jpowsour.2018.06.058.

* cited by examiner

*Primary Examiner* — Laura Weiner

(74) *Attorney, Agent, or Firm* — XSENSUS LLP

(57) ABSTRACT

A layered-oxide positive electrode active material may have a molecular formula of $Na_xMn_aFe_bNi_cM_dN_eO_{2-\delta}Q_f$, where a doping element M is selected from at least one of Cu, Li, Ti, Zr, K, Sb, Nb, Mg, Ca, Mo, Zn, Cr, W, Bi, Sn, Ge, or Al, a doping element N is selected from at least one of Si, P, B, S, or Se, a doping element Q is selected from at least one of F, Cl, or N, $0.66 \leq x \leq 1$, $0 < a \leq 0.70$, $0 < b \leq 0.70$, $0 < c \leq 0.23$, $0 \leq d < 0.30$, $0 \leq e \leq 0.30$, $0 \leq f \leq 0.30$, $0 \leq \delta \leq 0.30$, $a+b+c+d+e=1$, $0 < e+f \leq 0.30$, $0 < (e+f)/a \leq 0.30$, $0.20 \leq d+e+f \leq 0.30$, and $(b+c)/a \leq 1.5$.

12 Claims, 6 Drawing Sheets

LAYERED-OXIDE POSITIVE ELECTRODE ACTIVE MATERIAL AND POSITIVE ELECTRODE PLATE, SODIUM-ION BATTERY, AND ELECTRIC APPARATUS CONTAINING SAME

CROSS-REFERENCE TO RELATED APPLICATION

The present application is a continuation of International Application No. PCT/CN2021/142472, filed Dec. 29, 2021, which is incorporated herein by reference in its entirety.

TECHNICAL FIELD

This application relates to the field of battery technologies, and specifically, to a layered-oxide positive electrode active material and a positive electrode plate, a sodium-ion battery, and an electric apparatus containing the same.

BACKGROUND

Although taking a leading position in the new energy electric vehicle battery market, lithium-ion batteries face many challenges and difficulties on the way to further development, such as the shortage and uneven distribution of lithium resources and the rising prices of upstream materials including lithium and cobalt. Compared with lithium-ion batteries, sodium-based sodium-ion batteries have advantages of abundant sodium resources and low costs, presenting a new generation of electrochemical system that can replace and supplement lithium-ion batteries in the energy storage market where cost and scale are critical.

Positive electrode active materials play a key role in performance of sodium-ion batteries. Among widely studied positive electrode active materials such as polyanionic compounds, Prussian white, organic molecules, and layered oxides, layered oxides, with advantages of high theoretical specific capacity, high density, and the same manufacturing process as lithium-ion batteries, are a type of positive electrode active material with great application potential for sodium-ion batteries. However, as is currently reported, layered-oxide positive electrode active materials feature low capacity, poor coating effect, and poor water stability, being difficult to meet commercial performance requirements.

SUMMARY

This application aims to provide a layered-oxide positive electrode active material and a positive electrode plate, a sodium-ion battery, and an electric apparatus containing the same, so as to provide a positive electrode active material featuring high capacity, high water stability, easy coating, and simple preparation process for sodium-ion batteries.

A first aspect of this application provides a layered-oxide positive electrode active material, having a molecular formula of $Na_xMn_aFe_bNi_cM_dN_eO_{2-\delta}Q_f$, where a doping element M is selected from at least one of Cu, Li, Ti, Zr, K, Sb, Nb, Mg, Ca, Mo, Zn, Cr, W, Bi, Sn, Ge, or Al, a doping element N is selected from at least one of Si, P, B, S, or Se, a doping element Q is selected from at least one of F, Cl, or N, $0.66 \leq x \leq 1$, $0 < a \leq 0.70$, $0 < b \leq 0.70$, $0 < c \leq 0.23$, $0 \leq d < 0.30$, $0 \leq e \leq 0.30$, $0 \leq f \leq 0.30$, $0 \leq \delta \leq 0.30$, $a+b+c+d+e=1$, $0 < e+f \leq 0.30$, $0 < (e+f)/a \leq 0.30$, $0.20 \leq d+e+f \leq 0.30$, and $(b+c)/a \leq 1.5$.

The inventors of this application have surprisingly found that a layered-oxide positive electrode active material containing finely adjusted percentages of various elements and an appropriate percentage of doping non-metal elements features high capacity, high water stability, and easy coating at the same time.

In any implementation of this application, a space group of the layered-oxide positive electrode active material is R$\overline{3}$m.

In any implementation of this application, a characteristic peak intensity $I_1$ in an X-ray diffraction pattern (003) of the layered-oxide positive electrode active material that has been soaked in water for 24 h and a characteristic peak intensity $I_0$ in an X-ray diffraction pattern (003) of the layered-oxide positive electrode active material without soaking satisfy $I_1/I_0 \geq 0.2$. A smaller value of $I_1/I_0$ indicates poorer water stability of the layered-oxide positive electrode active material, that is, the layered-oxide positive electrode active material is more sensitive to water.

In any implementation of this application, the doping element M is selected from at least one of Cu, Li, Ti, Sb, or Mg.

In any implementation of this application, the doping element N is selected from at least one of Si, B, Se, or P.

In any implementation of this application, the doping element Q is F.

In any implementation of this application, $0.80 \leq x \leq 1$.

In any implementation of this application, $0.30 \leq a \leq 0.50$, and optionally $0.33 \leq a \leq 0.48$.

In any implementation of this application, $0.20 \leq b \leq 0.40$, and optionally $0.23 \leq b \leq 0.33$.

In any implementation of this application, $0.10 \leq c \leq 0.23$.

In any implementation of this application, $0 < e+f \leq 0.10$, and optionally $0.02 \leq e+f \leq 0.10$.

In any implementation of this application, $0.05 \leq (e+f)/a \leq 0.30$, and optionally $0.06 \leq (e+f)/a \leq 0.29$.

In any implementation of this application, $0 \leq \delta \leq 0.10$, and optionally $0 \leq \delta \leq 0.10$.

In any implementation of this application, $0 < d < 0.30$, $f=0$, and $0 < e < 0.30$. Optionally, $0.10 \leq d \leq 0.27$, $f=0$, and $0 < e \leq 0.10$.

In any implementation of this application, $0 < d < 0.30$, $e=0$, and $0 < f < 0.30$. Optionally, $0.10 \leq d \leq 0.27$, $e=0$, and $0 < f \leq 0.10$.

In any implementation of this application, $0 < d < 0.30$, $0 < e < 0.30$, and $0 < f < 0.30$. Optionally, $0.10 \leq d \leq 0.27$, $0 < e \leq 0.10$, and $0 < f \leq 0.10$.

In any implementation of this application, a layer spacing of 003 crystal plane $d_{003}$ of the layered-oxide positive electrode active material is 0.53 nm to 0.54 nm. In this case, the amount of Na contained in the layered-oxide positive electrode active material can be kept at a high level, bond energy for a Na—O bond is high, water stability of the layered-oxide positive electrode active material is also high, and Na is not easy to remove when the layered-oxide positive electrode active material is in contact with water.

In any implementation of this application, a median particle size by volume $D_v50$ of the layered-oxide positive electrode active material is 10 μm to 30 μm, and optionally 12 μm to 25 μm. The layered-oxide positive electrode active material with a median particle size by volume $D_v50$ in an appropriate range can have high specific capacity and compacted density, and a sodium-ion battery using it can have both good kinetic performance and high energy density.

In any implementation of this application, a specific surface area of the layered-oxide positive electrode active material is 0.1 m²/g to 5 m²/g, and optionally 0.3 m²/g to 3 m²/g. The layered-oxide positive electrode active material with an appropriate specific surface area can reduce absorption phenomena during preparation of a positive electrode slurry, thereby increasing solid content and facilitating uniformity of the positive electrode slurry, and improving uniformity and increasing compacted density of a positive electrode film layer. This increases specific capacity and energy density of the sodium-ion battery and improves rate performance and cycling performance of the sodium-ion battery.

In any implementation of this application, a tap density of the layered-oxide positive electrode active material is 1 g/cm³ to 3 g/cm³, and optionally 1.5 g/cm³ to 2.5 g/cm³. The layered-oxide positive electrode active material with a tap density in an appropriate range can further improve the capacity and energy density of the sodium-ion battery.

In any implementation of this application, a powder compacted density of the layered-oxide positive electrode active material under a pressure of 8 tons is 3 g/cm³ to 5 g/cm³, and optionally 3.5 g/cm³ to 4.5 g/cm³. The layered-oxide positive electrode active material with a powder compacted density in an appropriate range can further improve the capacity and energy density of the sodium-ion battery.

A second aspect of this application provides a positive electrode plate containing the layered-oxide positive electrode active material according to the first aspect of this application.

A third aspect of this application provides a sodium-ion battery including the positive electrode plate according to the second aspect of this application.

A fourth aspect of this application provides an electric apparatus including at least one of the sodium-ion battery according to the third aspect of this application, a battery module, and a battery pack, where the battery module and the battery pack are assembled with the sodium-ion battery according to the third aspect of this application, and the sodium-ion battery, battery module, or battery pack is used as a power source or energy storage unit for the electric apparatus.

BRIEF DESCRIPTION OF THE DRAWINGS

To describe the technical solutions in embodiments of this application more clearly, the following briefly describes the accompanying drawings for describing the embodiments of this application. Apparently, the accompanying drawings in the following descriptions show only some embodiments of this application, and a person of ordinary skill in the art may still derive other drawings from these accompanying drawings without creative efforts.

Figure 1:
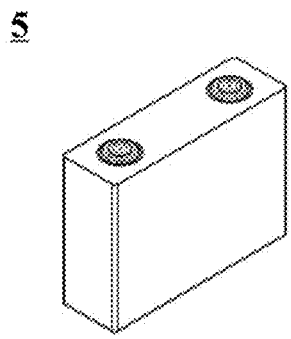
FIG. 1 is a schematic diagram of an embodiment of a sodium-ion battery according to this application.

In the accompanying drawings, the figures are not drawn to scale.

DESCRIPTION OF THE EMBODIMENTS

The following specifically discloses embodiments of a layered-oxide positive electrode active material and a positive electrode plate, a sodium-ion battery, and an electric apparatus containing the same with appropriate reference to detailed descriptions of accompanying drawings. However, unnecessary detailed descriptions may be omitted. For example, detailed descriptions of a well-known matter or overlapping descriptions of an actual identical structure have been omitted. This is to avoid unnecessary cumbersomeness of the following descriptions to facilitate understanding by persons skilled in the art. In addition, accompanying drawings and the following descriptions are provided for persons skilled in the art to fully understand this application and are not intended to limit the subject described in the claims.

"Ranges" disclosed in this application are defined in the form of lower and upper limits, given ranges are defined by selecting lower and upper limits, and the selected lower and upper limits define boundaries of special ranges. Ranges defined in the method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if low limit values of a range are given as 1 and 2, and upper limit values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, when a parameter is expressed as an integer greater than or equal to 2, this is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be mutually combined to form a new technical solution, and such technical solution should be considered to be included in the disclosure content of this application.

Unless otherwise specified, all the technical features and optional technical features of this application can be mutually combined to form a new technical solution, and such technical solution should be considered to be included in the disclosure content of this application.

Unless otherwise specified, all the steps in this application can be performed sequentially or randomly, or preferably, are performed sequentially. For example, a method including steps (a) and (b) indicates that the method may include steps (a) and (b) performed in sequence, or may include steps (b) and (a) performed in sequence. For example, the foregoing method may further include step (c), which indicates that step (c) may be added to the method in any order, for example, the method may include steps (a), (b), and (c), steps (a), (c), and (b), steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components may be included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

Layered-Oxide Positive Electrode Active Material

A first aspect of the embodiments of this application provides a layered-oxide positive electrode active material, having a molecular formula of $Na_xMn_aFe_bNi_cM_dN_eO_{2-\delta}Q_f$, where a doping element M is selected from at least one of Cu, Li, Ti, Zr, K, Sb, Nb, Mg, Ca, Mo, Zn, Cr, W, Bi, Sn, Ge, or Al, a doping element N is selected from at least one of Si, P, B, S, or Se, a doping element Q is selected from at least one of F, Cl, or N, $0.66 \leq x \leq 1$, $0 < a \leq 0.70$, $0 < b \leq 0.70$, $0 < c \leq 0.23$, $0 \leq d < 0.30$, $0 \leq e \leq 0.30$, $0 \leq f \leq 0.30$, $0 \leq \delta \leq 0.30$, $a+b+c+d+e=1$, $0 < e+f \leq 0.30$, $0 < (e+f)/a \leq 0.30$, $0.20 \leq d+e+f \leq 0.30$, and $(b+c)/a \leq 1.5$.

Layered-oxide positive electrode active materials are a type of positive electrode active material with great application potential for sodium-ion batteries, but none of the layered-oxide positive electrode active materials currently used in sodium-ion batteries can feature high capacity, high water stability, easy coating, simple preparation process, and low production cost at the same time. The layered-oxide positive electrode active material $Na_xMn_aFe_bNi_cM_dN_eO_{2-\delta}Q_f$ provided in the first aspect of the embodiments of this application features both high capacity and high water stability, has the advantages of easy coating, simple preparation process, and low production cost, and can meet actual commercial requirements.

The inventors of this application have surprisingly found that a layered-oxide positive electrode active material containing finely adjusted percentages of various elements and an appropriate percentage of doping non-metal elements features high capacity, high water stability, and easy coating at the same time. Without reference to any theory, the inventors speculate that a possible reason is that the finely adjusted percentages of various elements and the appropriate percentage of doping non-metal elements contained enable the layered-oxide positive electrode active material to have higher structural stability and water stability and have a more symmetrical and ordered crystal structure. For example, bond energy for bonds between transition metals (Mn, Fe, and Ni), sodium, and oxygen in layered-oxide positive electrode active materials is strong, which can alleviate reactions of the transition metals and sodium with water molecules and reduce dissolution of the transition metals and sodium. Therefore, the layered-oxide positive electrode active material is insensitive to moisture and is less likely to gel or cure upon coating.

The doping element M in the layered-oxide positive electrode active material of this application represents a metal element and is doped at a Na site or a transition metal site, for example, an Mn site, a Fe site, or a Ni site. The doping element M is selected from at least one of Cu, Li, Ti, Zr, K, Sb, Nb, Mg, Ca, Mo, Zn, Cr, W, Bi, Sn, Ge, or Al. Optionally, the doping element M is selected from at least one of Cu, Li, Ti, Sb, or Mg.

The doping element N and the doping element Q in the layered-oxide positive electrode active material of this application each represent a non-metal element, where the doping element N is doped at a transition metal site or in an oxygen tetrahedral void, and the doping element Q is doped at an O site. The doping element N is selected from at least one of Si, P, B, S, or Se, optionally, selected from at least one of Si, B, Se, or P, and further, selected from at least one of Si or B. The doping element Q is selected from at least one of F, Cl, or N, and optionally, selected from F.

The layered-oxide positive electrode active material of this application contains at least one non-metal doping element with a doping amount below 0.30, that is, $0 < e+f \leq 0.30$. The layered-oxide positive electrode active material doped with at least one non-metal element can have greatly increased crystallinity, and therefore has a more symmetrical and ordered crystal structure. In addition, considering capacity performance of the layered-oxide positive electrode active material, the amount of doping non-metal elements should not be too high. When the total doping amount of non-metal elements is greater than 0.30, excessive impurity phases with no electrochemical activity are introduced, and the specific capacity of the material are reduced.

Bond energy of an Mn—O chemical bond can be enhanced by controlling a ratio of contained non-metal elements to contained element Mn below 0.30, that is, $0 < (e+f)/a \leq 0.30$. In this case, the crystal structure of the layered-oxide positive electrode active material is more symmetrical and ordered, and particles of the layered-oxide positive electrode active material have lower surface energy and higher water stability. If the ratio of the contained non-metal elements to the contained element Mn is greater than 0.30, the crystal structure of the layered-oxide positive electrode active material is adversely affected, excessive impurity phases with no electrochemical activity are introduced, and the specific capacity of the material is reduced.

The inventors of this application have surprisingly found that when the total amount of doping elements (namely, the sum of amounts of the doping elements M, N, and Q) contained in the layered-oxide positive electrode active material is between 0.20 and 0.30, that is, $0.20 \leq d+e+f \leq 0.30$, the layered-oxide positive electrode active material presents excellent water stability and coating performance. When the total amount of doping elements contained in the layered-oxide positive electrode active material is less than 0.20, water stability and coating performance are not significantly improved; and when the total amount of doping elements contained in the layered-oxide positive electrode active material is greater than 0.30, excessive impurity phases with no electrochemical activity are introduced and the specific capacity of the material is reduced.

The inventors of this application have also found that the ratio of the total amount of contained elements Ni and Fe to the amount of contained element Mn (that is, (b+c)/a) also affects the specific capacity and water stability of the produced layered-oxide positive electrode active material. In a case that the ratio of the total amount of contained elements Ni and Fe to the amount of contained element Mn is greater than 1.5, more impurity phases such as NiO are introduced, causing a low specific capacity of the layered-oxide positive electrode active material. In addition, when the total amount of the contained elements Fe and Ni is excessively high, the layered-oxide positive electrode active material has poor water stability and is apt to experience side reactions under the action of water molecules or solvent molecules to generate impurity phases including NiO and $Fe_3O_4$, causing poor storage performance and cycling performance of batteries using the layered-oxide positive electrode active material.

The layered-oxide positive electrode active material of this application contains a small amount of element Ni, so that the layered-oxide positive electrode active material has a higher capacity at a high voltage (for example, a voltage greater than 2.5 V), and the production cost is lower.

A specific discharge capacity of the layered-oxide positive electrode active material of this application is above 120 mAh/g, and a capacity retention rate after water washing is above 95%, above 96%, above 98%, or even 100% (that is, no capacity attenuation after water washing).

A space group of the layered-oxide positive electrode active material of this application is $R\bar{3}m$, which belongs to the hexagonal crystal system. The "hexagonal crystal system" is a crystal system structure having the following unit cell parameters: $a=b\neq c$, $\alpha=\beta=90°$, and $\gamma=120°$.

The layered-oxide positive electrode active material of this application has high water stability. In some embodiments, a characteristic peak intensity $I_1$ in an X-ray diffraction pattern (003) of the layered-oxide positive electrode active material that has been soaked in water for 24 h and a characteristic peak intensity $I_0$ in an X-ray diffraction pattern (003) of the layered-oxide positive electrode active material without soaking satisfy $I_1/I_0 \geq 0.2$. Optionally, $I_1/I_0 \geq 0.3$, $I_1/I_0 \geq 0.4$, or $I_1/I_0 \geq 0.5$. A smaller value of $I_1/I_0$ indicates poorer water stability of the layered-oxide positive electrode active material, that is, the layered-oxide positive electrode active material is more sensitive to water.

In some embodiments, $0.80 \leq x \leq 1$, $0.85 \leq x \leq 1$, $0.90 \leq x \leq 1$, or $0.95 \leq x \leq 1$.

In some embodiments, $0.30 \leq a \leq 0.50$, and optionally $0.33 \leq a \leq 0.48$.

In some embodiments, $0.20 \leq b \leq 0.40$, and optionally $0.23 < b \leq 0.33$.

In some embodiments, $0.10 \leq c \leq 0.23$.

In some embodiments, $d=0$. In other embodiments, $0 < d < 0.30$, and optionally $0.10 \leq d \leq 0.30$, $0.10 \leq d \leq 0.29$, $0.10 \leq d \leq 0.28$, $0.10 \leq cl \leq 0.27$, $0.10 \leq d \leq 0.26$, $0.10 \leq d \leq 0.25$, $0.10 \leq d \leq 0.24$, $0.10 \leq d \leq 0.23$, $0.10 \leq d \leq 0.22$, $0.10 \leq d \leq 0.21$, or $0.10 \leq d \leq 0.20$.

In some embodiments, $e=0$. In other embodiments, $0 < e \leq 0.30$, and optionally $0 < e < 0.30$, $0 < e \leq 0.25$, $0 < e \leq 0.20$, $0 < e \leq 0.15$, $0 < e \leq 0.10$, $0 < e \leq 0.09$, $0 < e \leq 0.08$, $0 < e \leq 0.07$, $0 < e \leq 0.06$, $0 < e \leq 0.05$, $0 < e \leq 0.04$, $0 < e \leq 0.03$, or $0 < e \leq 0.02$.

In some embodiments, $f=0$. In other embodiments, $0 < f \leq 0.30$, and optionally $0 < f < 0.30$, $0 < f \leq 0.25$, $0 < f \leq 0.20$, $0 < f \leq 0.15$, $0 < f \leq 0.10$, $0 < f \leq 0.09$, $0 < f \leq 0.08$, $0 < f \leq 0.07$, $0 < f \leq 0.06$, $0 < f \leq 0.05$, $0 < f \leq 0.04$, $0 < f \leq 0.03$, or $0 < f \leq 0.02$.

In some embodiments, $\delta=0$. In other embodiments, $0 < \delta \leq 0.30$, $0 < \delta \leq 0.30$, $0 < \delta \leq 0.25$, $0 < \delta \leq 0.20$, $0 < \delta \leq 0.15$, $0 < \delta \leq 0.10$, $0 < \delta \leq 0.05$, or $0 < \delta \leq 0.02$.

In some embodiments, $0 < e+f \leq 0.25$, $0 < e+f \leq 0.20$, $0 < e+f \leq 0.15$, $0 < e+f \leq 0.10$, $0.02 \leq e+f \leq 0.30$, $0.02 \leq e+f \leq 0.25$, $0.02 \leq e+f \leq 0.20$, $0.02 \leq e+f \leq 0.15$, $0.02 \leq e+f \leq 0.10$, $0.05 \leq e+f \leq 0.30$, $0.05 \leq e+f \leq 0.25$, $0.05 \leq e+f \leq 0.20$, $0.05 \leq e+f \leq 0.15$, or $0.05 \leq e+f \leq 0.10$.

In some embodiments, $0.05 \leq (e+f)/a \leq 0.30$, $0.06 \leq (e+f)/a \leq 0.30$, $0.08 \leq (e+f)/a \leq 0.30$, $0.10 \leq (e+f)/a \leq 0.30$, $0.12 \leq (e+f)/a \leq 0.30$, $0.14 \leq (e+f)/a \leq 0.30$, $0.15 \leq (e+f)/a \leq 0.30$, $0.06 \leq (e+f)/a \leq 0.29$, $0.08 \leq (e+f)/a \leq 0.29$, $0.10 \leq (e+f)/a \leq 0.29$, $0.12 \leq (e+f)/a \leq 0.29$, $0.14 \leq (e+f)/a \leq 0.29$, or $0.15 \leq (e+f)/a \leq 0.29$.

In some embodiments, $0 < d < 0.30$, $f=0$, and $0 < e < 0.30$. Optionally, $0.10 \leq d \leq 0.27$, $f=0$, and $0 < e \leq 0.10$.

In some embodiments, $0 < d < 0.30$, $e=0$, and $0 < f < 0.30$. Optionally, $0.10 \leq d \leq 0.27$, $e=0$, and $0 < f \leq 0.10$.

In some embodiments, $0 < d < 0.30$, $0 < e < 0.30$, and $0 < f < 0.30$. Optionally, $0.10 \leq d \leq 0.27$, $0 < e \leq 0.10$, and $0 < f \leq 0.10$.

In some embodiments, $d=0$, $f=0$, and $0.20 \leq e \leq 0.30$.

In some embodiments, $d=0$, $e=0$, and $0.20 \leq f \leq 0.30$.

In some embodiments, $d=0$, $0 < e < 0.30$, and $0 < f < 0.30$.

In some embodiments, a layer spacing of 003 crystal plane $d_{003}$ of the layered-oxide positive electrode active material is 0.53 nm to 0.54 nm. In this case, the amount of Na contained in the layered-oxide positive electrode active material can be kept at a high level, bond energy for a Na—O bond is high, water stability of the layered-oxide positive electrode active material is also high, and Na is not easy to remove when the layered-oxide positive electrode active material is in contact with water.

In some embodiments, a median particle size by volume $D_v50$ of the layered-oxide positive electrode active material is 10 μm to 30 μm, and optionally 12 μm to 25 μm. The layered-oxide positive electrode active material with a median particle size by volume $D_v50$ in an appropriate range can have high specific capacity and compacted density, and a sodium-ion battery using it can have both good kinetic performance and high energy density.

The layered-oxide positive electrode active material with a median particle size by volume $D_v50$ in an appropriate range can also ensure that the layered-oxide positive electrode active material has an appropriate specific surface area. An excessively large specific surface area easily leads to increased irreversible consumptions of sodium ions and increased side reactions on the particle surface, which reduces electrochemical performance of sodium-ion batteries. An excessively small specific surface area also causes deterioration of the electrochemical performance of sodium-ion batteries, for example, deterioration of kinetic performance. The layered-oxide positive electrode active material with an appropriate specific surface area can also reduce absorption phenomena during preparation of a positive electrode slurry, thereby increasing solid content and facilitating uniformity of the positive electrode slurry, and improving uniformity and increasing compacted density of a positive electrode film layer. This increases specific capacity and energy density of the sodium-ion battery and improves rate performance and cycling performance of the sodium-ion battery.

In some embodiments, a specific surface area of the layered-oxide positive electrode active material is 0.1 $m^2$/g to 5 $m^2$/g, and optionally 0.3 $m^2$/g to 3 $m^2$/g.

In some embodiments, a tap density of the layered-oxide positive electrode active material is 1 g/$cm^3$ to 3 g/$cm^3$, and optionally 1.5 g/$cm^3$ to 2.5 g/$cm^3$. The layered-oxide positive electrode active material with a tap density in an appropriate range can further improve the capacity and energy density of the sodium-ion battery.

In some embodiments, a powder compacted density of the layered-oxide positive electrode active material under a pressure of 8 tons is 3 g/cm$^3$ to 5 g/cm$^3$, and optionally 3.5 g/cm$^3$ to 4.5 g/cm$^3$. The layered-oxide positive electrode active material with a powder compacted density in an appropriate range can further improve the capacity and energy density of the sodium-ion battery.

The layer spacing of 003 crystal plane $d_{003}$ and space group of the layered-oxide positive electrode active material have meanings well known in the art. An X-ray powder diffractometer may be used to measure an X-ray diffraction pattern in accordance with JIS K0131-1996 general rules for X-ray diffraction analysis to obtain the layer spacing of 003 crystal plane $d_{003}$ and space group. For example, a Bruker D8 Discover X-ray diffractometer from Bruker AxS, Germany is used with a CuK$_\alpha$ ray as a radiation source, a ray wavelength of $\lambda$=1.5406 Å, a scanning angle 2θ ranging from 10° to 80°, and a scanning rate of 4°/min.

The particle size $D_v50$ of the layered-oxide positive electrode active material has a meaning well known in the art and may be measured with an instrument and a method that are well known in the art. For example, $D_v50$ may be measured in accordance with GB/T 19077-2016 "Particle Size Analysis-Laser Diffraction Method" by using a laser particle size analyzer, for example, the Mastersizer 2000E laser particle size analyzer produced by Malvern Instruments Ltd. in the UK.

The specific surface area of the layered-oxide positive electrode active material has a meaning well known in the art and may be measured with an instrument and a method that are well known in the art. For example, in accordance with GB/T 19587-2017 "Determination of the specific surface area of solids by gas adsorption using the BET method", testing is performed by using a nitrogen adsorption specific surface area analysis test method, and calculation is performed by using the BET (Brunauer Emmett Teller) method to obtain the specific surface area. The nitrogen adsorption specific surface area analysis test may be carried out by using the TriStar II 3020 specific surface and pore analyzer produced by Micromeritics Instrument Corporation in the USA.

The tap density of the layered-oxide positive electrode active material may be measured with an instrument and a method known in the art, for example, may be measured in accordance with GB/T 5162-2006 "Metallic powders—Determination of tap density" by a tap density tester, for example, the FZS4-4B tap density tester.

The powder compacted density of the layered-oxide positive electrode active material may be measured with an instrument and a method known in the art, for example, may be measured in accordance with GB/T 24533-2009 powder compacted density measurement method by using an electronic pressure testing machine, for example, the UTM7305 electronic pressure tester.

[Preparation Method]

The first aspect of the embodiments of this application further provides a preparation method of layered-oxide positive electrode active material. According to the method, the above-mentioned layered-oxide positive electrode active material can be prepared.

The layered-oxide positive electrode active material may be prepared according to a solid-phase method, which features simple operation and convenience for mass production. An example preparation method includes the following steps: At S10, Na source, Fe source, Mn source, Ni source, M source, N source, and Q source are mixed in proportion to obtain precursor powder; and at S20, sintering treatment is performed on the obtained precursor powder so that the layered-oxide positive electrode active material is obtained. M is selected from at least one of Cu, Li, Ti, Zr, K, Sb, Nb, Mg, Ca, Mo, Zn, Cr, W, Bi, Sn, Ge, or Al, N is selected from at least one of Si, P, B, S, or Se, and Q is selected from at least one of F, Cl, or N. A molar ratio of Na:Mn:Fe:Ni:M:N:Q is x:a:b:c:d:e:f, where 0.66≤x≤1, 0<a≤0.70, 0<b≤0.70, 0<c≤0.23, 0≤s<0.30, 0≤e≤0.30, 0≤f≤0.30, a+b+c+d+e=1, 0<e+f≤0.30, 0<(e+f)/a≤0.30, 0.20≤d+e+f≤0.30, and (b+c)/a≤1.5.

In some embodiments, the method further includes step S30, in which the obtained layered-oxide positive electrode active material is subjected to crushing and then sieving to obtain a layered-oxide positive electrode active material with an appropriate particle size and specific surface area. This application imposes no particular limitation on a crushing method, which may be selected based on an actual need, for example, a particle crusher may be used.

In an example, the Na source may be at least one of $Na_2CO_3$, $NaHCO_3$, $NaNO_3$, NaOH, $Na_2O_2$, or $Na_2O$; the Fe source may be at least one of carbonate, nitrate, acetate, oxalate, sulfate, chloride, hydroxide, or oxide containing element Fe; the Mn source may be at least one of carbonate, nitrate, acetate, oxalate, sulfate, chloride, hydroxide, or oxide containing element Mn; the Ni source may be at least one of carbonate, nitrate, acetate, oxalate, sulfate, chloride, hydroxide, or oxide containing element Ni; the M source may be at least one of carbonate, nitrate, acetate, oxalate, sulfate, chloride, hydroxide, or oxide containing element M; the N source may be at least one of carbonate, nitrate, acetate, oxalate, sulfate, chloride, hydroxide, or oxide containing element N; and the Q source may be at least one of $NH_4Q$ or NaQ. For example, when Q is represented as F, the Q source may be at least one of $NH_4F$ or NaF.

In preparation of the precursor powder, the Na source actually added may slightly outnumber a specified amount. For example, the amount of the actually added Na source is controlled at 100% to 110% of a theoretical mass of the Na source, where the theoretical mass is a mass calculated based on a stoichiometric ratio of a molecular formula of the layered-oxide positive electrode active material.

At S10, the precursor powder may be prepared by using a ball milling or mechanical stirring method, for example, a planetary ball mill is used. This application imposes no particular limitation on ball milling or mechanical stirring time, which may be adjusted based on an actual need, for example, 0.5 h to 2 h.

At S20, a sintering temperature may be 600° C. to 1200° C., and optionally 700° C. to 1100° C., or 850° C. to 1000° C.

At S20, a sintering time (or a temperature hold time) may be 10 h to 20 h.

At S20, the sintering treatment may be performed in a muffle furnace in an oxygen-containing sintering atmosphere, which is optionally an air atmosphere.

In some embodiments, before the sintering treatment, pre-sintering treatment may be performed at a slightly lower temperature, for example, 600° C. to 900° C., for 10 h 20 h.

The layered-oxide positive electrode active material may alternatively be prepared by using a co-precipitation method. An example preparation method includes the following steps: At S100, Fe source, Mn source, Ni source, and M source are dissolved in deionized water in proportion to obtain a mixed solution; at S200, the obtained mixed solution and a precipitating agent solution are subjected to a co-precipitation reaction, and a generated product is collected and dried to obtain powder; and at S300, the obtained powder is mixed with Na source, N source and Q source in proportion, and then the mixture is subjected to sintering treatment to obtain the layered-oxide positive electrode active material. M is selected from at least one of Cu, Li, Ti, Zr, K, Sb, Nb, Mg, Ca, Mo, Zn, Cr, W, Bi, Sn, Ge, or Al, N is selected from at least one of Si, P, B, S, or Se, and Q is selected from at least one of F, Cl, or N. A molar ratio of Na:Mn:Fe:Ni:M:N:Q is x:a:b:c:d:e:f, where $0.66 \leq x \leq 1$, $0 < a \leq 0.70$, $0 < b \leq 0.70$, $0 < c \leq 0.23$, $0 \leq d < 0.30$, $0 \leq e \leq 0.30$, $0 \leq f \leq 0.30$, $a+b+c+d+e=1$, $0 < e+f \leq 0.30$, $0 < (e+f)/a \leq 0.30$, $0.20 \leq d+e+f \leq 0.30$, and $(b+c)/a \leq 1.5$.

In some embodiments, the method further includes step S400, in which the obtained layered-oxide positive electrode active material is subjected to crushing and then sieving to obtain a layered-oxide positive electrode active material with an appropriate particle size and specific surface area. This application imposes no particular limitation on a crushing method, which may be selected based on an actual need, for example, a particle crusher may be used.

At S200, anion of the precipitating agent may include at least one of $OH^-$, $CO_3^{2-}$, or $C_2O_4^{2-}$. Optionally, the precipitating agent includes at least one of ammonia water, sodium carbonate, or sodium oxalate.

At S300, the Na source actually added may slightly outnumber a specified amount. For example, the amount of the actually added Na source is controlled at 100% to 110% of a theoretical mass of the Na source, where the theoretical mass is a mass calculated based on a stoichiometric ratio of a molecular formula of the layered-oxide positive electrode active material.

At S300, the obtained powder may be mixed with the Na source, the N source, and the Q source by using a ball milling or mechanical stirring method, for example, a planetary ball mill is used. This application imposes no particular limitation on ball milling or mechanical stirring time, which may be adjusted based on an actual need, for example, 0.5 h to 2 h.

At S300, a sintering temperature may be 600° C. to 1200° C., and optionally 700° C. to 1100° C., or 850° C. to 1000° C.

At S300, a sintering time (or a temperature hold time) may be 10 h to 20 h.

At S300, the sintering treatment may be performed in a muffle furnace in an oxygen-containing sintering atmosphere, which is optionally an air atmosphere.

In some embodiments, before the sintering treatment, pre-sintering treatment may be performed at a slightly lower temperature, for example, 600° C. to 900° C., for 10 h 20 h. The atmosphere of the pre-sintering treatment may be an oxygen-containing atmosphere, which is optionally an air atmosphere.

In an example, the Fe source may be at least one of nitrate, sulfate, or chloride containing element Fe; the Mn source may be at least one of nitrate, sulfate, or chloride containing element Mn; the Ni source may be at least one of nitrate, sulfate, or chloride containing element Ni; the M source may be at least one of nitrate, sulfate, or chloride containing element M; the Na source may be at least one of $Na_2CO_3$, $NaHCO_3$, $NaNO_3$, NaOH, $Na_2O_2$, or $Na_2O$; the N source may be at least one of carbonate, nitrate, acetate, oxalate, sulfate, chloride, hydroxide, or oxide containing element N; and the Q source may be at least one of $NH_4Q$ or NaQ. For example, when Q is represented as F, the Q source may be at least one of $NH_4F$ or NaF.

Positive Electrode Plate

A second aspect of the embodiments of this application provides a positive electrode plate containing the layered-oxide positive electrode active material according to the first aspect of the embodiments of this application.

In some embodiments, the positive electrode plate includes a positive electrode current collector and a positive electrode film layer disposed on at least one surface of the positive electrode current collector and including a positive electrode active material. For example, the positive electrode current collector has two opposite surfaces in its thickness direction, and the positive electrode film layer is provided on either or both of the two opposite surfaces of the positive electrode current collector.

The positive electrode active material includes the layered-oxide positive electrode active material according to the first aspect of the embodiments of this application, but other positive electrode active materials different from the above-mentioned layered-oxide positive electrode active material are not excluded for use in the positive electrode plate. For example, the other positive electrode active materials may be well-known positive electrode active materials for sodium-ion batteries in the art, including but not limited to polyanionic compounds, Prussian white, and organic molecules. One of these other positive electrode active materials may be used alone, or two or more of them may be used in combination.

In some embodiments, the positive electrode film layer further optionally includes a positive electrode conductive agent. This application imposes no particular limitation on a type of the positive electrode conductive agent. In an example, the positive electrode conductive agent includes at least one of superconducting carbon, conductive graphite, acetylene black, carbon black, Ketjen black, carbon dots, carbon nanotubes, graphene, or carbon nanofibers.

In some embodiments, the positive electrode film layer further optionally includes a positive electrode binder. This application imposes no particular limitation on a type of the positive electrode binder. In an example, the positive electrode binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, fluorine-containing acrylate resin, styrenebutadiene rubber (SBR), water-soluble unsaturated resin SR-1B, water-based acrylic resin (for example, polyacrylic acid PAA, polymethacrylic acid PMAA, or sodium polyacrylate PAAS), polyacrylamide (PAM), polyvinyl alcohol (PVA), sodium alginate (SA), or carboxymethyl chitosan (CMCS).

In some embodiments, the positive electrode current collector may be a metal foil or a composite current collector. For example, an aluminum foil may be used as the metal foil. The composite current collector may include a polymer material matrix and a metal material layer formed on at least one surface of the polymer material matrix. In an example, the metal material may include at least one of aluminum, aluminum alloy, nickel, nickel alloy, titanium, titanium alloy, silver, or silver alloy. In an example, the polymer material matrix may include polypropylene (PP), polyethylene terephthalate (PET), polybutylene terephthalate (PBT), polystyrene (PS), polyethylene (PE), or the like.

The positive electrode film layer is usually formed by applying a positive electrode slurry onto the positive electrode current collector, followed by drying and cold pressing. The positive electrode slurry is usually formed by dispersing the positive electrode active material and optionally, the conductive agent, the binder or any other components in a solvent and stirring them evenly. The solvent may be but is not limited to N-methylpyrrolidone (NMP).

The positive electrode plate does not exclude additional functional layers other than the positive electrode film layer. For example, in some embodiments, the positive electrode plate described in this application further includes a conductive primer layer (for example, formed by a conductive agent and a binder) disposed on the surface of the positive electrode current collector and sandwiched between the positive electrode current collector and the positive electrode film layer. In some other embodiments, the positive electrode plate of this application further includes a protection layer covering the surface of the positive electrode film layer.

Sodium-Ion Battery

A third aspect of the embodiments of this application provides a sodium-ion battery, including a positive electrode plate, a negative electrode plate, and an electrolyte. During charging and discharging of the battery, sodium ions migrate between the positive electrode plate and the negative electrode plate for intercalation and deintercalation, and the electrolyte conducts sodium ions between the positive electrode plate and the negative electrode plate. The sodium-ion battery of this application may be used in energy storage power supply systems such as hydroelectric power plants, thermal power plants, wind power plants, and solar power plants, and many other fields including electric tools, electric bicycles, electric motorcycles, electric vehicles, military equipment, and aerospace.

[Positive Electrode Plate]

The positive electrode plate used in the sodium-ion battery of this application is the positive electrode plate described in any one of the embodiments of the second aspect of this application.

[Negative Electrode Plate]

In some embodiments, the negative electrode plate may be a metal sodium sheet.

In some embodiments, the negative electrode plate includes a negative electrode current collector and a negative electrode film layer disposed on at least one surface of the negative electrode current collector and including a negative electrode active material. For example, the negative electrode current collector has two opposite surfaces in its thickness direction, and the negative electrode film layer is provided on either or both of the two opposite surfaces of the negative electrode current collector.

The negative electrode active material may be a well-known negative electrode active material used for sodium-ion batteries in the art. In an example, the negative electrode active material includes but is not limited to at least one of natural graphite, artificial graphite, soft carbon, hard carbon, or mesocarbon microbead. However, this application is not limited to these materials and may also use other conventional well-known materials that can be used as negative electrode active materials for sodium-ion batteries. One of these negative electrode active materials may be used alone, or two or more of them may be used in combination.

In some embodiments, the negative electrode film layer further optionally includes a negative electrode conductive agent. This application imposes no particular limitation on a type of the negative electrode conductive agent. In an example, the negative electrode conductive agent includes at least one of superconducting carbon, conductive graphite, acetylene black, carbon black, Ketjen black, carbon dots, carbon nanotubes, graphene, or carbon nanofibers.

In some embodiments, the negative electrode film layer further optionally includes a negative electrode binder. This application imposes no particular limitation on a type of the negative electrode binder. In an example, the negative electrode binder may include at least one of styrene-butadiene rubber (SBR), water-soluble unsaturated resin SR-1B, water-based acrylic resin (for example, polyacrylic acid PAA, polymethacrylic acid PMAA, or sodium polyacrylate PAAS), polyacrylamide (PAM), polyvinyl alcohol (PVA), sodium alginate (SA), or carboxymethyl chitosan (CMCS).

In some embodiments, the negative electrode film layer further optionally includes other additives. In an example, the other additives may include a thickener, for example, sodium carboxymethyl cellulose (CMC-Na) or a PTC thermistor material.

In some embodiments, the negative electrode current collector may be a metal foil or a composite current collector. For example, a copper foil may be used as the metal foil. The composite current collector may include a polymer material matrix and a metal material layer formed on at least one surface of the polymer material matrix. In an example, the metal material may include at least one of copper, copper alloy, nickel, nickel alloy, titanium, titanium alloy, silver, or silver alloy. In an example, the polymer material matrix may include polypropylene (PP), polyethylene terephthalate (PET), polybutylene terephthalate (PBT), polystyrene (PS), polyethylene (PE), or the like.

The negative electrode film layer is usually formed by applying a negative electrode slurry onto the negative electrode current collector, followed by drying and cold-pressing. The negative electrode slurry is usually formed by dispersing the negative electrode active material, the optional conductive agent, the optional binder, and the optional other additives in a solvent and stirring them evenly. The solvent may be but is not limited to N-methylpyrrolidone (NMP) or deionized water.

The negative electrode plate does not exclude additional functional layers other than the negative electrode film layer. For example, in some embodiments, the negative electrode plate described in this application further includes a conductive primer layer (for example, formed by a conductive agent and a binder) disposed on the surface of the negative electrode current collector and sandwiched between the negative electrode current collector and the negative electrode film layer. In some other embodiments, the negative electrode plate of this application further includes a protection layer covering the surface of the negative electrode film layer.

[Electrolyte]

The electrolyte is not limited to any particular type in this application and can be selected based on a need. For example, the electrolyte may be selected from at least one of a solid electrolyte and a liquid electrolyte (that is, an electrolyte solution).

In some embodiments, the electrolyte is an electrolyte solution, which includes an electrolytic salt and a solvent.

The electrolytic salt is not limited to any particular type and can be selected based on an actual need. In some embodiments, for example, the electrolytic salt may include at least one of $NaPF_6$, $NaClO_4$, $NaBCL_4$, $NaSO_3CF_3$, or $Na(CH_3)C_6H_4SO_3$.

The solvent is not limited to any particular type and can be selected based on an actual need. In some embodiments, for example, the solvents include at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methyl sulfone (MSM), ethyl methyl sulfone (EMS), and diethyl sulfone (ESE).

In some embodiments, the electrolyte solution further optionally includes an additive. For example, the additives may include a negative electrode film-forming additive, or may include a positive electrode film-forming additive, or may include an additive that can improve some performance of a battery, for example, an additive for improving overcharge performance of the battery, an additive for improving high-temperature performance of the battery, and an additive for improving low-temperature power performance of the battery.

[Separator]

Sodium-ion batteries using an electrolyte solution and some sodium-ion batteries using a solid electrolyte further include a separator. The separator is disposed between the positive electrode plate and the negative electrode plate to mainly prevent a short circuit between positive and negative electrodes and to allow sodium ions to pass through. The separator is not limited to any particular type in this application and may be any commonly known porous separator with good chemical stability and mechanical stability.

In some embodiments, a material of the separator may be at least one of glass fiber, non-woven fabric, polyethylene, polypropylene, and polyvinylidene fluoride. The separator may be a single-layer thin film or a multilayer composite thin film. When the separator is a multilayer composite thin film, each layer may be made of the same material or different materials.

In some embodiments, the positive electrode plate, the separator, and the negative electrode plate may be made into an electrode assembly through winding or lamination.

In some embodiments, the sodium-ion battery may include an outer package. The outer package is used for packaging the electrode assembly and the electrolyte.

In some embodiments, the outer package of the sodium-ion battery may be a hard shell, for example, a hard plastic shell, an aluminum shell, or a steel shell. The outer package of the sodium-ion battery may alternatively be a soft pack, for example, a soft pouch. A material of the soft pack may be plastic, for example, at least one of polypropylene (PP), polybutylene terephthalate (PBT), polybutylene succinate (PBS), or the like.

The sodium-ion battery is not limited to any particular shape in this application, which may be cylindrical, rectangular, or of any other shape. FIG. 1 shows a sodium-ion battery 5 of a rectangular structure as an example.

Figure 2:
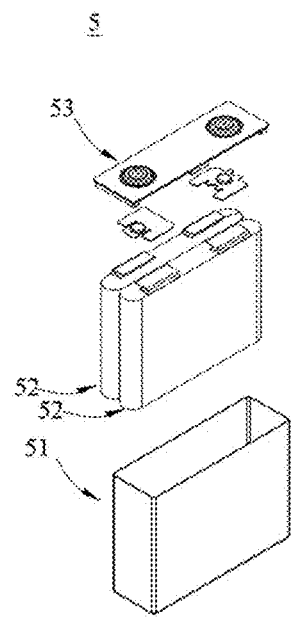
FIG. 2 is a schematic exploded view of the embodiment of the sodium-ion battery in FIG. 1.

In some embodiments, as shown in FIG. 2, the outer package may include a housing 51 and a cover plate 53. The housing 51 may include a base plate and side plates connected onto the base plate, and the base plate and the side plates enclose an accommodating cavity. The housing 51 has an opening communicating with the accommodating cavity, and the cover plate 53 is configured to cover the opening to seal the accommodating cavity. The positive electrode plate, the negative electrode plate, and the separator may be made into an electrode assembly 52 through winding or lamination. The electrode assembly 52 is encapsulated into the accommodating cavity. The electrolyte infiltrates the electrode assembly 52. There may be one or more electrode assemblies 52 in the sodium-ion battery 5, and the quantity may be adjusted as required.

A method for preparing the sodium-ion battery of this application is well-known. In some embodiments, the positive electrode plate, separator, negative electrode plate, and electrolyte solution may be assembled to form a sodium-ion battery. For example, the positive electrode plate, separator, and negative electrode plate may be made into an electrode assembly through winding or lamination; and the electrode assembly is put in the outer package and dried, and the electrolyte solution is injected, followed by vacuum packaging, standing, formation, shaping, and other processes, to obtain a sodium-ion battery.

In some embodiments, sodium-ion batteries in this application may be assembled into a battery module, and the battery module may include a plurality of sodium-ion batteries. The specific quantity may be adjusted based on use and capacity of the battery module.

Figure 3:
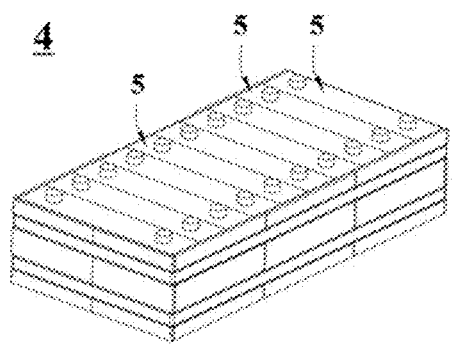
FIG. 3 is a schematic diagram of an embodiment of a battery module according to this application.

FIG. 3 is a schematic diagram of an example battery module 4. As shown in FIG. 3, in the battery module 4, a plurality of sodium-ion batteries 5 may be sequentially arranged in a length direction of the battery module 4. Certainly, the sodium-ion batteries may alternatively be arranged in any other manner. Further, the plurality of sodium-ion batteries 5 may be fastened by using fasteners.

Optionally, the battery module 4 may further include a housing with an accommodating space, and the plurality of sodium-ion batteries 5 are accommodated in the accommodating space.

In some embodiments, the battery modules may be further assembled into a battery pack, and a quantity of battery modules included in the battery pack may be adjusted based on use and capacity of the battery pack.

Figure 4:
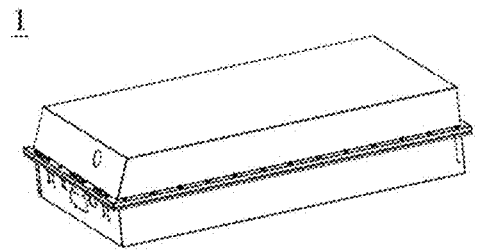
FIG. 4 is a schematic diagram of an embodiment of a battery pack according to this application.
Figure 5:
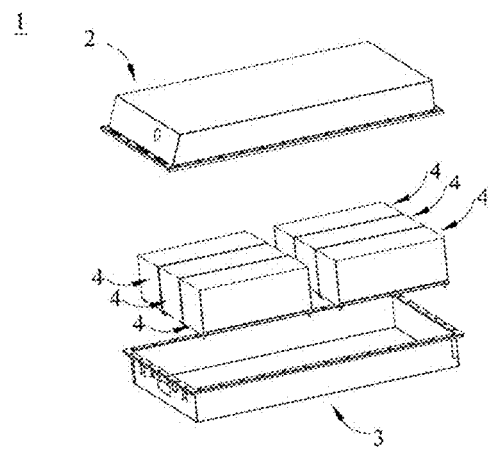
FIG. 5 is a schematic exploded view of the embodiment of the battery pack in FIG. 4.

FIG. 4 and FIG. 5 are schematic diagrams of the battery pack 1 as an example. As shown in FIG. 4 and FIG. 5, the battery pack 1 may include a battery box and a plurality of battery modules 4 arranged in the battery box. The battery box includes an upper box body 2 and a lower box body 3. The upper box body 2 is configured to cover the lower box body 3 to form an enclosed space for accommodating the battery modules 4. The plurality of battery modules 4 may be arranged in the battery box in any manner.

Electric Apparatus

A fourth aspect of the embodiments of this application provides an electric apparatus, which includes at least one of the sodium-ion battery of this application, a battery module, and a battery pack, where the battery module and the battery pack are assembled with the sodium-ion battery. The sodium-ion battery, battery module, or battery pack may be used as a power source or an energy storage unit for the electric apparatus. The electric apparatus may be but is not limited to a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf cart, or an electric truck), an electric train, a ship, a satellite system, an energy storage system, or the like.

A sodium-ion battery, a battery module, or a battery pack may be selected for the electric apparatus based on requirements for using the electric apparatus, where the battery module or battery pack is assembled with the sodium-ion battery.

Figure 6:
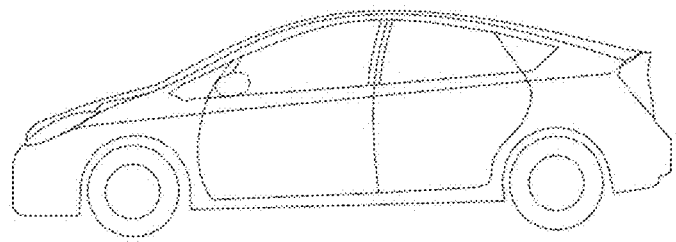
FIG. 6 is a schematic diagram of an embodiment of an electric apparatus using the sodium-ion battery of this application as a power source.
Figure 7:
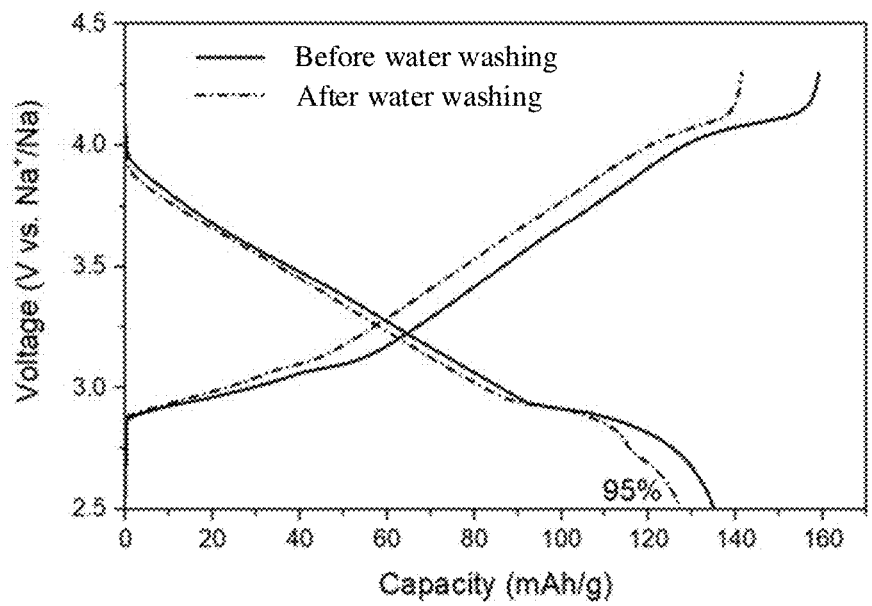
FIG. 7 is a comparison diagram of charge and discharge curves of a layered-oxide positive electrode active material prepared in Example 1 before and after water washing.
Figure 8:
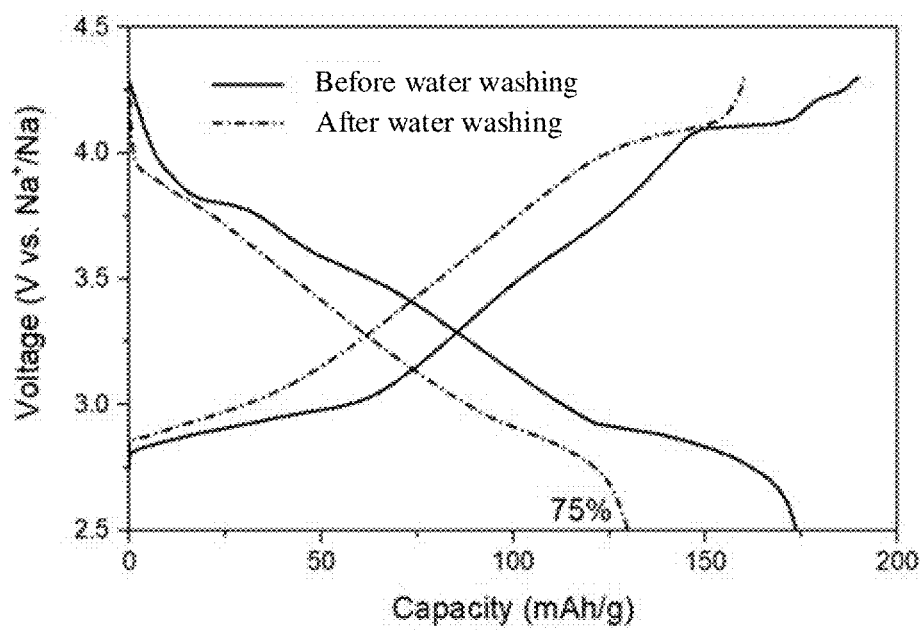
FIG. 8 is a comparison diagram of charge and discharge curves of a layered-oxide positive electrode active material prepared in Comparative Example 1 before and after water washing.
Figure 9:
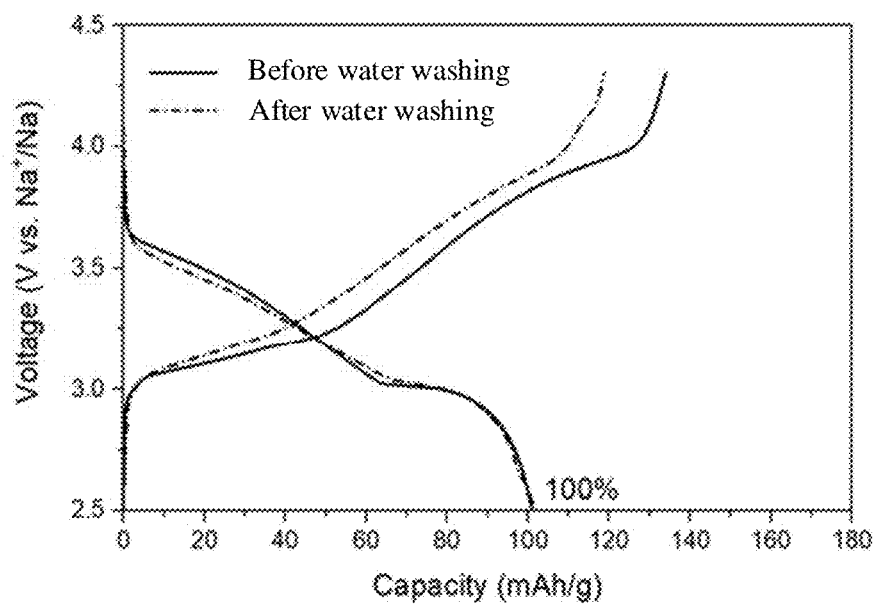
FIG. 9 is a comparison diagram of charge and discharge curves of a layered-oxide positive electrode active material prepared in Comparative Example 2 before and after water washing.
Figure 10:
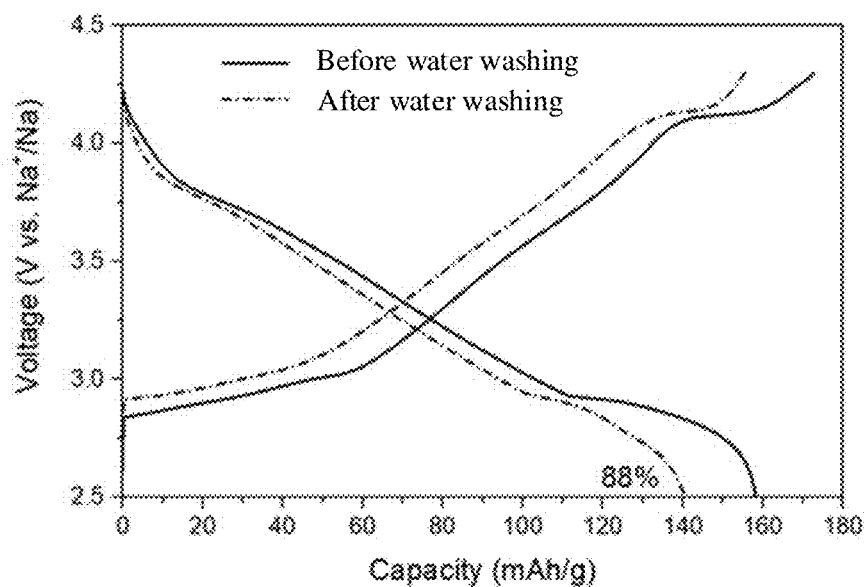
FIG. 10 is a comparison diagram of charge and discharge curves of a layered-oxide positive electrode active material prepared in Comparative Example 3 before and after water washing.
Figure 11:
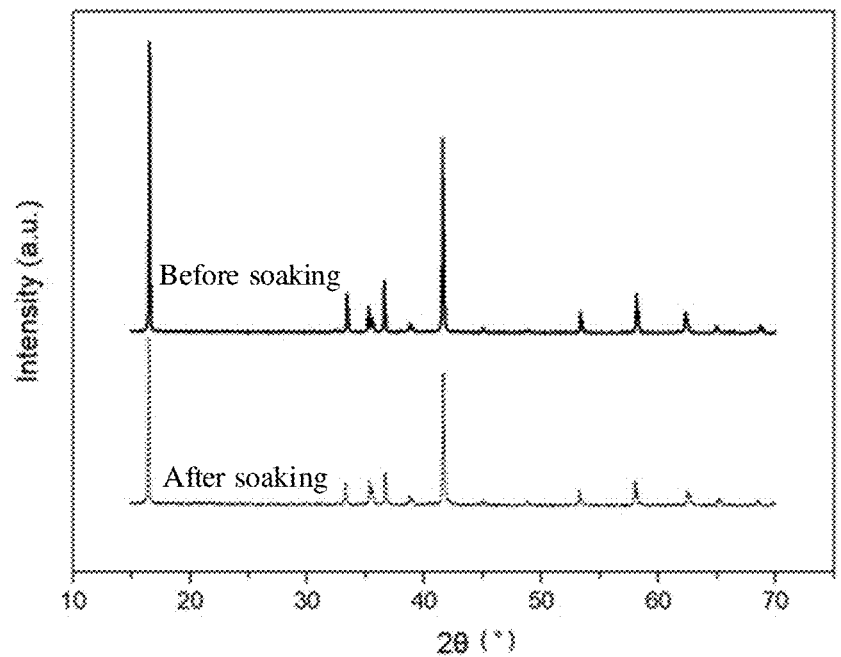
FIG. 11 is a comparison diagram of XRD of a layered-oxide positive electrode active material prepared in Example 1 before and after soaking in water for 24 h.
Figure 12:
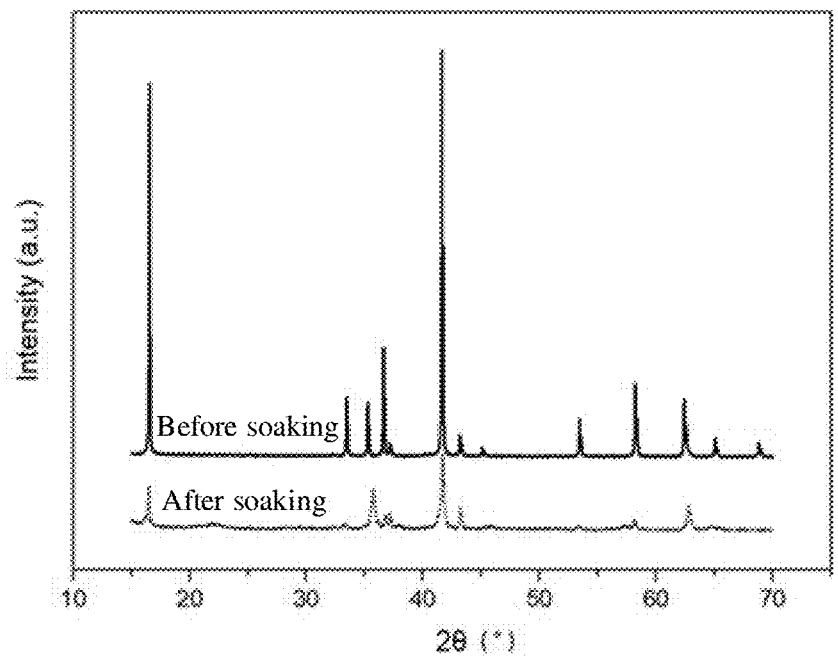
FIG. 12 is a comparison diagram of XRD of a layered-oxide positive electrode active material prepared in Comparative Example 1 before and after soaking in water for 24 h.
Figure 13:
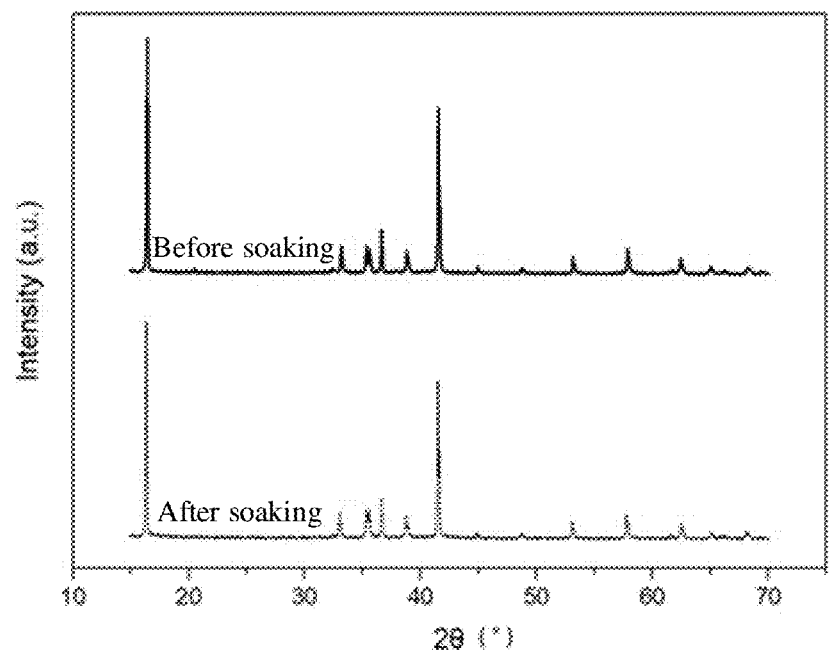
FIG. 13 is a comparison diagram of XRD of a layered-oxide positive electrode active material prepared in Comparative Example 2 before and after soaking in water for 24 h.
Figure 14:
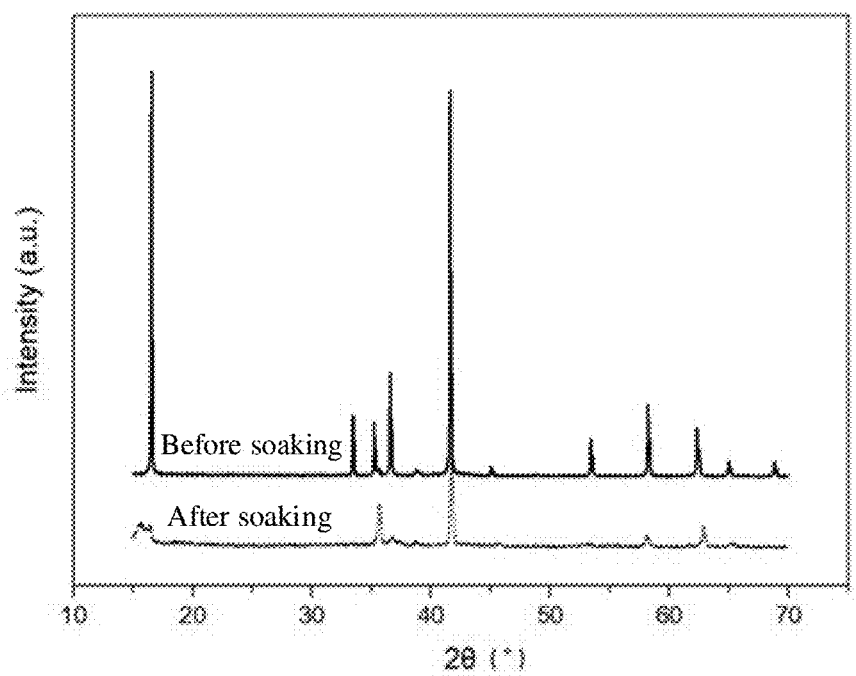
FIG. 14 is a comparison diagram of XRD of a layered-oxide positive electrode active material prepared in Comparative Example 3 before and after soaking in water for 24 h.

FIG. 6 is a schematic diagram of an electric apparatus as an example. The electric apparatus is a battery electric vehicle, a hybrid electric vehicle, a plug-in hybrid electric vehicle, or the like. To satisfy a requirement of the electric apparatus for high power and high energy density, a battery pack or a battery module may be used.

In another example, the electric apparatus may be a mobile phone, a tablet computer, a notebook computer, or the like. The electric apparatus is generally required to be light and thin and may use a sodium-ion battery as its power source.

EXAMPLES

Content disclosed in this application is described in detail in the following examples. These examples are intended only for illustrative purposes because various modifications and changes made without departing from the scope of the content disclosed in this application are apparent to persons skilled in the art. Unless otherwise stated, all parts, percentages, and ratios reported in the following examples are based on mass, all reagents used in the examples are commercially available or synthesized in a conventional manner, and can be used directly without further treatment, and all instruments used in the examples are commercially available.

Example 1

Preparation of Layered-Oxide Positive Electrode Active Material $Na_2CO_3$, CuO, $SiO_2$, NiO, $Fe_2O_3$, and $Mn_2O_3$ were mixed at a molar ratio of 1:0.18:0.03:0.13:0.33:0.33 of Na:Cu:Si:Ni:Fe:Mn and a total of 30 g sample was weighed. The obtained sample was pre-ground in an agate mortar and then added to a planetary ball mill for ball milling for 1 h to obtain a precursor mixture. The obtained precursor mixture was evenly placed in an open crucible, then heated in a muffle furnace from a room temperature to 950° C. at a heating rate of 5° C./min, and kept at a constant temperature of 950° C. for 15 h. After natural cooling, the precursor mixture was subjected to crushing and sieving, so that a layered-oxide positive electrode active material $NaCu_{0.18}Si_{0.03}Ni_{0.13}Fe_{0.33}Mn_{0.33}O_2$ was obtained.

Examples 2 to 13 and Comparative Examples 1 to 9

The preparation method of layered-oxide positive electrode active material was similar to the method in Example 1 except that layered-oxide positive electrode active materials shown in Table 1 were prepared with adjustment of process parameters for preparation of the layered-oxide positive electrode active materials. MgO was used as Mg source, $B_2O_3$ was used as B source, $Li_2O$ was used as Li source, $Sb_2O_3$ was used as Sb source, $TiO_2$ was used as Ti source, and NaF was used as F source.

TABLE 1

| Sequence number | Layered-oxide positive electrode active material | | Sintering temperature (° C.) | Sintering time (h) | $D_v50$ (μm) |
|---|---|---|---|---|---|
| Example 1 | $NaCu_{0.18}Si_{0.03}Ni_{0.13}Fe_{0.33}Mn_{0.33}O_2$ | Na:Cu:Si:Ni:Fe:Mn = 1:0.18:0.03:0.13:0.33:0.33 | 950 | 15 | 15 |
| Example 2 | $NaMg_{0.18}B_{0.03}Ni_{0.13}Fe_{0.33}Mn_{0.33}O_2$ | Na:Mg:B:Ni:Fe:Mn = 1:0.18:0.03:0.13:0.33:0.33 | 950 | 15 | 17 |
| Example 3 | $NaMg_{0.10}Cu_{0.10}Ni_{0.13}Fe_{0.33}Mn_{0.34}O_{1.95}F_{0.05}$ | Na:Mg:CuNi:Fe:Mn:F = 1:0.10:0.10:0.13:0.33:0.34:0.05 | 950 | 15 | 19 |
| Example 4 | $NaCu_{0.10}B_{0.05}Si_{0.05}Ni_{0.13}Fe_{0.33}Mn_{0.34}O_2$ | Na:Cu:B:Si:Ni:Fe:Mn = 1:0.10:0.05:0.05:0.13:0.33:0.34 | 950 | 15 | 16 |
| Example 5 | $NaLi_{0.10}B_{0.05}Mg_{0.05}Ni_{0.23}Fe_{0.23}Mn_{0.34}O_2$ | Na:Li:B:Mg:Ni:Fe:Mn = 1:0.10:0.05:0.05:0.23:0.23:0.34 | 950 | 15 | 23 |
| Example 6 | $NaSb_{0.10}Mg_{0.05}Si_{0.05}Ni_{0.23}Fe_{0.23}Mn_{0.34}O_2$ | Na:Sb:Mg:Si:Ni:Fe:Mn = 1:0.10:0.05:0.05:0.23:0.23:0.34 | 950 | 15 | 24 |
| Example 7 | $NaMg_{0.10}B_{0.05}Si_{0.05}Ni_{0.13}Fe_{0.33}Mn_{0.34}O_2$ | Na:Mg:B:Si:Ni:Fe:Mn = 1:0.10:0.05:0.05:0.13:0.33:0.34 | 950 | 15 | 19 |
| Example 8 | $NaCu_{0.15}Ni_{0.19}Fe_{0.31}Mn_{0.35}O_{1.95}F_{0.05}$ | Na:Cu:Ni:Fe:Mn:F = 1:0.15:0.19:0.31:0.35:0.05 | 950 | 15 | 20 |
| Example 9 | $Na_{0.9}Cu_{0.20}B_{0.02}Ti_{0.05}Ni_{0.10}Fe_{0.30}Mn_{0.33}O_2$ | Na:Cu:B:Ti:Ni:Fe:Mn = 0.90:0.20:0.02:0.05:0.10:0.30:0.33 | 950 | 15 | 14 |
| Example 10 | $Na_{0.9}Cu_{0.1}Si_{0.05}Ti_{0.05}Ni_{0.10}Fe_{0.30}Mn_{0.40}O_2$ | Na:Cu:Si:Ti:Ni:Fe:Mn = 0.9:0.1:0.05:0.05:0.10:0.30:0.40 | 950 | 15 | 13 |
| Example 11 | $Na_{0.9}Cu_{0.22}Ti_{0.05}Ni_{0.15}Fe_{0.28}Mn_{0.30}O_{1.98}F_{0.02}$ | Na:Cu:Ti:Ni:Fe:Mn:F = 0.90:0.22:0.05:0.15:0.28:0.30:0.02 | 950 | 15 | 20 |
| Example 12 | $Na_{0.95}Cu_{0.18}Ni_{0.10}Fe_{0.24}Mn_{0.48}O_{1.95}F_{0.05}$ | Na:Cu:Ni:Fe:Mn:F = 0.95:0.18:0.10:0.24:0.48:0.05 | 950 | 15 | 13 |
| Example 13 | $Na_{0.95}Cu_{0.18}Ni_{0.10}Fe_{0.22}Mn_{0.48}B_{0.02}O_{1.97}F_{0.03}$ | Na:Cu:Ni:Fe:Mn:B:F = 0.95:0.18:0.10:0.22:0.48:0.02:0.03 | 950 | 15 | 15 |
| Comparative Example 1 | $NaNi_{0.33}Fe_{0.33}Mn_{0.34}O_2$ | Na:Ni:Fe:Mn = 1:0.33:0.33:0.34 | 950 | 15 | 19 |
| Comparative Example 2 | $NaNi_{0.33}Fe_{0.33}Mn_{0.34}O_2$ | Na:Cu:Fe:Mn = 1:0.33:0.33:0.34 | 950 | 15 | 24 |
| Comparative Example 3 | $NaCu_{0.1}Ni_{0.23}Fe_{0.33}Mn_{0.34}O_2$ | Na:Cu:Ni:Fe:Mn = 1:0.1:0.23:0.33:0.34 | 950 | 15 | 21 |
| Comparative Example 4 | $NaZn_{0.18}Ni_{0.15}Fe_{0.33}Mn_{0.34}O_2$ | Na:Zn:Ni:Fe:Mn = 1:0.18:0.15:0.33:0.34 | 950 | 15 | 23 |
| Comparative Example 5 | $NaNi_{0.33}Fe_{0.33}Mn_{0.34}O_{1.95}F_{0.05}$ | Na:Ni:Fe:Mn:F = 1:0.33:0.33:0.34:0.05 | 950 | 15 | 18 |
| Comparative Example 6 | $NaCu_{0.12}B_{0.05}Si_{0.05}Ni_{0.10}Fe_{0.38}Mn_{0.30}O_2$ | Na:Cu:B:Si:Ni:Fe:Mn = 1:0.12:0.05:0.05:0.10:0.38:0.30 | 950 | 15 | 17 |
| Comparative Example 7 | $NaCu_{0.14}B_{0.04}Si_{0.04}Ni_{0.10}Fe_{0.38}Mn_{0.30}O_2$ | Na:Cu:B:Si:Ni:Fe:Mn = 1:0.14:0.04:0.04:0.10:0.38:0.30 | 950 | 15 | 16 |

TABLE 1-continued

| Sequence number | Layered-oxide positive electrode active material | | Sintering temperature (° C.) | Sintering time (h) | $D_v50$ (μm) |
|---|---|---|---|---|---|
| Comparative Example 8 | $NaCu_{0.25}B_{0.05}Si_{0.05}Ni_{0.10}Fe_{0.30}Mn_{0.25}O_2$ | Na:Cu:B:Si:Ni:Fe:Mn = 1:0.25:0.05:0.05:0.10:0.30:0.25 | 950 | 15 | 20 |
| Comparative Example 9 | $NaCu_{0.12}B_{0.02}Si_{0.02}Ni_{0.10}Fe_{0.44}Mn_{0.30}O_2$ | Na:Cu:B:Si:Ni:Fe:Mn = 1:0.12:0.02:0.02:0.10:0.44:0.30 | 950 | 15 | 18 |

Tests (1) Test on Layer Spacing of 003 Crystal Plane $d_{003}$ of Layered-Oxide Positive Electrode Active Material and Space Group In a drying room or glove box, a sample under test was ground in an agate mortar and then sieved through a 350-mesh sieve. An appropriate amount of the sieved sample was taken and placed into the middle of a groove of a sample holder, so that loose sample powder was slightly above the level of the sample holder. A glass slide was used to lightly press the surface of the sample to make the surface of the sample flat and align with the level of the holder, and scrape off excess powder. After sample preparation was completed, testing was performed by using a Brucker D8A_A25 X-ray powder diffractometer from Brucker AxS in Germany with a $CuK_\alpha$ ray as a radiation source, a ray wavelength of $\lambda=1.5406$ Å, a scanning angle 2θ ranging from 10° to 80°, and a scanning rate of 4°/min. After the test was completed, the layer spacing of 003 crystal plane $d_{003}$ can be obtained based on an angle corresponding to 003 crystal plane, the Bragg equation $2d \cdot \sin θ = \lambda$, and the fact that each unit cell of 003 crystal plane includes three transition metal layers. The space group of the sample can be determined by comparing an XRD diffraction peak of the sample with a standard card of an XRD analysis software.

(2) Test on Coating Performance of Layered-Oxide Positive Electrode Active Material The layered-oxide positive electrode active material, the conductive agent carbon black (Super P), and the binder polyvinylidene fluoride (PVDF) were mixed in a mass ratio of 80:15:5 and continuously stirred in an appropriate amount of solvent NMP for 5 min to observe whether gelling or curing occurs.

(3) Test on Specific Discharge Capacity of Layered-Oxide Positive Electrode Active Material After the layered-oxide positive electrode active material was prepared into a button battery at 25° C., the battery was charged to 4.3 V with a constant current at a current density of 10 mA/g, and then discharged to 2.5 V with a constant current at a current density of 10 mA/g to obtain discharge capacity C0 of the button battery. Specific discharge capacity of the layered-oxide positive electrode active material (mAh/g)=discharge capacity C0 of the button battery/quality of the layered-oxide positive electrode active material.

The button battery is prepared according to steps shown below.

Preparation of positive electrode plate: The layered-oxide positive electrode active material, conductive agent carbon black (Super P), binder polyvinylidene fluoride (PVDF) were mixed in a mass ratio of 80:15:5 and fully stirred in an appropriate amount of solvent NMP to form a uniform positive electrode slurry; and the positive electrode slurry was evenly applied onto a surface of a positive electrode current collector aluminum foil, followed by drying and cold pressing, to form a 14 mm disc, so that the positive electrode plate was obtained.

Negative electrode plate: A metal sodium sheet was used.

Preparation of electrolyte: Ethylene carbonate (EC) was mixed with diethyl carbonate (DEC) in equal volumes to obtain an organic solvent, and then $NaClO_4$ was dissolved in the organic solvent to prepare an electrolyte with a concentration of 1 mol/L.

Separator: A porous polyethylene film was used as a separator.

Preparation of button battery: The above-mentioned positive electrolyte plate, separator, and negative electrode plate were stacked in sequence, so that the separator was placed between the positive electrode plate and the negative electrode plate for separation, and the above-prepared electrolyte solution was added to complete the preparation of a button battery.

(4) Water Washing Test on Layered-Oxide Positive Electrode Active Material 5 g of layered-oxide positive electrode active material was taken and placed in a beaker, and 15 mL deionized water was added and vigorously stirred for 1 min, followed by filtration and 6 h vacuum drying at 60° C., so that a layered-oxide positive electrode active material that has been washed was obtained.

The X-ray powder diffractometer in the above test (1) was used to observe whether new impurity phases appear in an X-ray diffraction pattern of the layered-oxide positive electrode active material that has been washed.

The layered-oxide positive electrode active material that has been washed was assembled into a button battery according to the method shown in test (3), and discharge capacity C1 of the button battery was recorded.

Discharge capacity retention rate of the layered-oxide positive electrode active material that has been washed (%)=discharge capacity C1 of the button battery/discharge capacity C0 of the button battery×100%.

(5) Soaking Test on Layered-Oxide Positive Electrode Active Material 5 g of layered-oxide positive electrode active material was taken and placed in a beaker, 15 mL deionized water was added and vigorously stirred for 1 min. After being left standing for 24 h, the mixture was subjected to filtration and 6 h vacuum drying at 60° C., so that a layered-oxide positive electrode active material that had been soaked in water was obtained.

The X-ray powder diffractometer in the above test (1) was used to observe changes in a characteristic peak intensity in an X-ray diffraction pattern (003) of the layered-oxide positive electrode active material before and after soaking in water for 24 h. $I_1$ represents a characteristic peak intensity in an X-ray diffraction pattern (003) of the layered-oxide positive electrode active material that has been soaked in water for 24 h, and $J_0$ represents a characteristic peak intensity in an X-ray diffraction pattern (003) of the layered-oxide positive electrode active material without soaking. $I_1/I_0$ can indicate water stability of the layered-oxide positive electrode active material. A smaller value of $I_1/I_0$ indicates poorer water stability of the layered-oxide positive electrode active material, that is, the layered-oxide positive electrode active material is more sensitive to water.

Table 2 shows test results of Examples 1 to 13 and Comparative Examples 1 to 9.

TABLE 2

| Sequence number | $d_{003}$ (nm) | Any gelling or curing? | Specific discharge capacity (mAh/g) | Discharge capacity retention rate after water washing | Any new impurity phases after water washing? | $I_1/I_0$ |
|---|---|---|---|---|---|---|
| Example 1 | 0.536 | No | 134 | 95% | No | 0.54 |
| Example 2 | 0.535 | No | 128 | 96% | No | 0.53 |
| Example 3 | 0.539 | No | 141 | 96% | No | 0.55 |
| Example 4 | 0.534 | No | 142 | 95% | No | 0.49 |
| Example 5 | 0.535 | No | 147 | 96% | No | 0.43 |
| Example 6 | 0.536 | No | 152 | 98% | No | 0.82 |
| Example 7 | 0.536 | No | 151 | 96% | No | 0.45 |
| Example 8 | 0.536 | No | 143 | 95% | No | 0.46 |
| Example 9 | 0.535 | No | 125 | 99% | No | 0.77 |
| Example 10 | 0.535 | No | 121 | 96% | No | 0.56 |
| Example 11 | 0.532 | No | 128 | 96% | No | 0.57 |
| Example 12 | 0.538 | No | 123 | 100% | No | 0.87 |
| Example 13 | 0.536 | No | 124 | 98% | No | 0.84 |
| Comparative Example 1 | 0.536 | Yes | 173 | 75% | Yes | 0.06 |
| Comparative Example 2 | 0.542 | No | 103 | 100% | No | 0.88 |
| Comparative Example 3 | 0.536 | Yes | 157 | 88% | Yes | 0.12 |
| Comparative Example 4 | 0.535 | Yes | 135 | 80% | Yes | 0.18 |
| Comparative Example 5 | 0.532 | Yes | 161 | 78% | Yes | 0.08 |
| Comparative Example 6 | 0.538 | Yes | 99 | 78% | Yes | 0.09 |
| Comparative Example 7 | 0.538 | Yes | 101 | 73% | Yes | 0.04 |
| Comparative Example 8 | 0.539 | Yes | 92 | 76% | Yes | 0.08 |
| Comparative Example 9 | 0.537 | Yes | 103 | 70% | Yes | 0.03 |

It can be learned from the test results in Table 2 that the layered-oxide positive electrode active material containing finely adjusted percentages of various elements and an appropriate percentage of doping non-metal elements features high capacity, high water stability, and easy coating at the same time.

FIG. 7 to FIG. 10 are comparison diagrams of charge and discharge curves of the layered-oxide positive electrode active materials respectively prepared in Example 1 and Comparative Examples 1 to 3 before and after water washing. FIG. 11 to FIG. 14 are comparison diagrams of XRD of the layered-oxide positive electrode active materials respectively prepared in Example 1 and Comparative Examples 1 to 3 before and after soaking in water for 24 h. The charge and discharge curves of the layered-oxide positive electrode active material of Example 1 have changed little after water washing, no new impurity phases appear after the material has been soaked in water for 24 h, and the intensity and position of each characteristic peak are well maintained, indicating that the layered-oxide positive electrode active material of Example 1 has high water stability. The charge and discharge curves of the layered-oxide positive electrode active material of Comparative Example 1 are quite different after water washing, a discharge capacity retention rate is only 75%, new impurity phases appear after the material has been soaked in water for 24 h, and the intensity and position of each characteristic peak have changed significantly, indicating that the layered-oxide positive electrode active material of Comparative Example 1 has poor water stability and is apt to gel or cure upon coating. The charge and discharge curves of the layered-oxide positive electrode active material of Comparative Example 2 have changed little after water washing, no new impurity phases appear after the material has been soaked in water for 24 h, and the intensity and position of each characteristic peak are well maintained, indicating that the layered-oxide positive electrode active material of Comparative Example 2 has high water stability. However, a specific discharge capacity of the material of Comparative Example 2 is only 103 mAh/g before water washing. Therefore, the layered-oxide positive electrode active material doped only with a high content of metal elements cannot feature high capacity, high water stability, and easy coating at the same time. The charge and discharge curves of the layered-oxide positive electrode active material of Comparative Example 3 are quite different after water washing, a discharge capacity retention rate is only 88%, new impurity phases appear after the material has been soaked in water for 24 h, and the intensity and position of each characteristic peak have changed significantly, indicating that the layered-oxide positive electrode active material of Comparative Example 3 has poor water stability. Therefore, the layered-oxide positive electrode active material doped only with a low content of metal elements at transition metal sites hardly has its water stability improved. Similarly, in Comparative Example 4, only a low content of metal element Zn is doped at the Na site, which hardly improves water stability of the layered-oxide positive electrode active material.

In Comparative Example 5, although non-metal elements are doped in the layered-oxide positive electrode active material, the content of the non-metal elements is low, which hardly improves water stability of the layered-oxide positive electrode active material.

In Comparative Examples 6 to 9, both metal element and non-metal element are doped in the layered-oxide positive electrode active material, but with inappropriate contents. To be specific, the Ni content and the Fe content are high, the Mn content is low, and a ratio of the total amount of contained elements Ni and Fe to the amount of contained element Mn, (b+c)/a is greater than 1.5. At this point, the obtained layered-oxide positive electrode active material is apt to have side reactions with water molecules and produce impurity phases such as NiO and $Fe_3O_4$, causing the material to have low capacity and poor water stability and is apt to gel or cure upon coating. A ratio of the amount of contained non-metallic elements to the amount of contained element Mn in each of the layered-oxide positive electrode active materials obtained in Comparative Example 6 and Comparative Example 8, (e+f)/a is greater than 0.30. In such cases, excessive impurity phases without electrochemical activity are introduced, further reducing specific capacity of the material. The total amount of doping elements in the layered-oxide positive electrode active material obtained in Comparative Example 9, d+e+f, is less than 0.20, which leads to very poor water stability. A characteristic peak intensity of (003) decreases significantly after the material has been soaked in water for 24 h, and the value of $I_1/I_0$ is the smallest.

It should be noted that this application is not limited to the foregoing embodiments. The foregoing embodiments are merely examples, and embodiments having constructions substantially the same as those of the technical idea and having the same effects as the technical idea within the scope of the technical solutions of this application are all included in the technical scope of this application. In addition, within the scope without departing from the essence of this application, various modifications that can be conceived by persons skilled in the art are applied to the embodiments, and other modes constructed by combining some of the constituent elements in the embodiments are also included in the scope of this application.

The invention claimed is:

1. A layered-oxide positive electrode active material, having a molecular formula of $Na_xMn_aFe_bNi_cM_dN_eO_{2-\delta}Q_f$, wherein
a doping element M is selected from at least one of Cu, Li, Ti, Sb, or Mg; a doping element N is selected from at least one of Si, P, B or Se; a doping element Q is F, $0.66 \leq x \leq 1$, $0 < a \leq 0.70$, $0 < b \leq 0.70$, $0 < c \leq 0.23$, $0 \leq d < 0.30$, $0 < e \leq 0.30$, $0 < \delta \leq 0.30$, $\delta = f$, $a+b+c+d+e=1$, $0 < e+f \leq 0.30$, $0 < (e+f)/a \leq 0.30$, $0.20 \leq d+e+f \leq 0.30$ and $0 < (b+c)/a \leq 1.5$, and
a characteristic peak intensity $I_1$ in an X-ray diffraction pattern (003) of the layered-oxide positive electrode active material that has been soaked in water for 24 h and a characteristic peak intensity $I_0$ in an X-ray diffraction pattern (003) of the layered-oxide positive electrode active material without soaking satisfy $I_1/I_0 \geq 0.2$.

2. The layered-oxide positive electrode active material according to claim 1, wherein a space group of the layered-oxide positive electrode active material measured by an X-ray diffraction technique is R$\bar{3}$m.

3. The layered-oxide positive electrode active material according to claim 1, wherein the layered-oxide positive electrode active material satisfies at least one of conditions (1) to (7):
(1) $0.80 \leq x \leq 1$;
(2) $0.30 \leq a \leq 0.50$;
(3) $0.20 \leq b \leq 0.40$;
(4) $0.10 \leq c \leq 0.23$;
(5) $0 < e+f \leq 0.10$;
(6) $0.05 \leq (e+f)/a \leq 0.30$; or
(7) $0 \leq \delta \leq 0.10$.

4. The layered-oxide positive electrode active material according to claim 1, wherein the layered-oxide positive electrode active material satisfies condition (10):
(10) $0 < d < 0.30$, $0 < e < 0.30$, and $0 < \delta < 0.30$.

5. The layered-oxide positive electrode active material according to claim 1, wherein a layer spacing of 003 crystal plane $d_{003}$ of the layered-oxide positive electrode active material is 0.53 nm to 0.54 nm.

6. The layered-oxide positive electrode active material according to claim 1, wherein a median particle size by volume $D_v50$ of the layered-oxide positive electrode active material is 10 μm to 30 μm.

7. The layered-oxide positive electrode active material according to claim 1, wherein a specific surface area of the layered-oxide positive electrode active material is 0.1 m$^2$/g to 5 m$^2$/g.

8. The layered-oxide positive electrode active material according to claim 1, wherein a tap density of the layered-oxide positive electrode active material is 1 g/cm$^3$ to 3 g/cm$^3$.

9. The layered-oxide positive electrode active material according to claim 1, wherein a powder compacted density of the layered-oxide positive electrode active material under a pressure of 8 tons is 3 g/cm$^3$ to 5 g/cm$^3$.

10. A positive electrode plate, comprising the layered-oxide positive electrode active material according to claim 1.

11. A sodium-ion battery, comprising the positive electrode plate according to claim 10.

12. An electric apparatus, comprising at least one of the sodium-ion battery according to claim 11, a battery module, and a battery pack, wherein the battery module and the battery pack are assembled with the sodium-ion battery, and the sodium-ion battery, battery module, or battery pack is used as a power source or energy storage unit for the electric apparatus.

* * * * *